May 6, 1952     C. H. ZIMMERMAN     2,595,500
CUTTING TOOL
Filed Nov. 29, 1946     2 SHEETS—SHEET 1
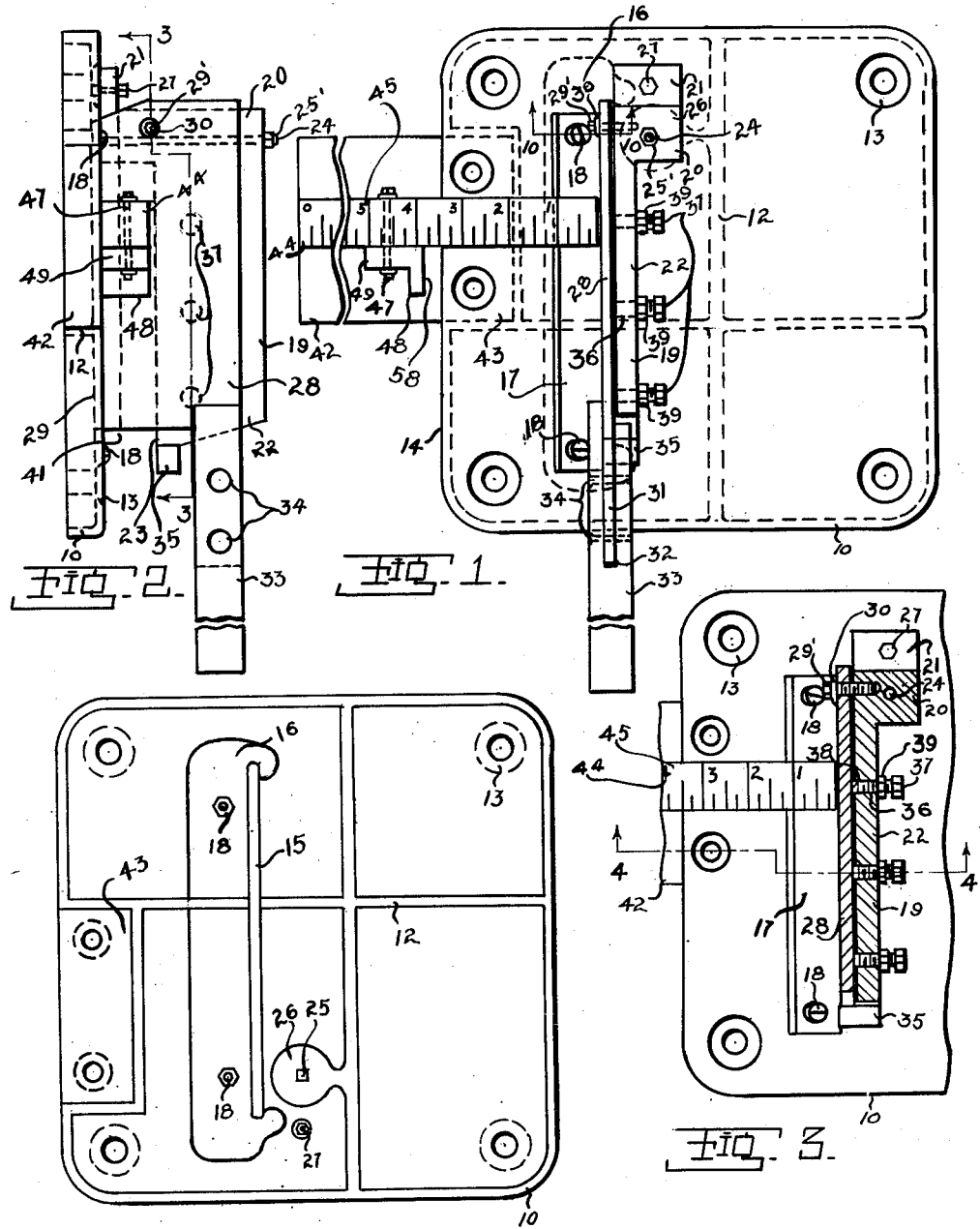
INVENTOR.
CHARLES H. ZIMMERMAN
BY Joseph A. Rave
ATTORNEY

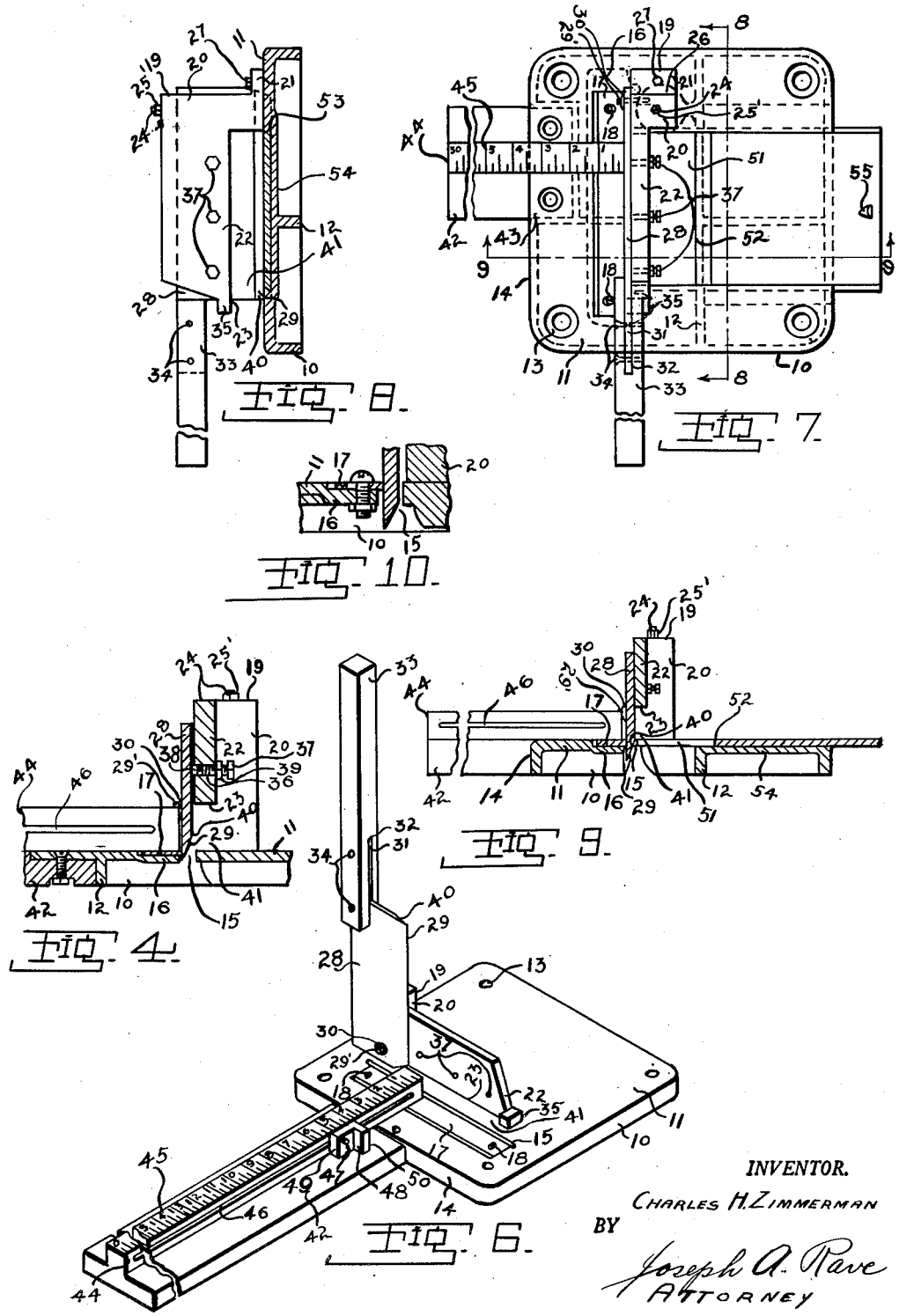

Patented May 6, 1952

2,595,500

UNITED STATES PATENT OFFICE 2,595,500

CUTTING TOOL

Charles H. Zimmerman, Norwood, Ohio, assignor to Zimmerman Packing Company, Norwood, Ohio, a corporation of Ohio Application November 29, 1946, Serial No. 712,926

10 Claims. (Cl. 164—44)

This invention relates to improvements in cutting tools and particularly to a cutting tool for cutting relatively soft material such as plastic and for cutting soft flexible material such as rubber, cork and the like.

The cutting tool of this invention utilizes a swinging or oscillatable cutter or knife blade which, in and of itself, is not new. In the past cutting cools of this general description did not cleanly cut or sever the material being operated upon due to the fact that the blade had a tendency to be deflected by the said material being cut.

It is therefore, the principal object of the present invention to provide a cutting tool of the swinging or oscillatable blade type that is held against deflection during the cutting operation.

Another object of the present invention is the provision of a cutting tool of the swinging or oscillatable knife type wherein the said blade is adequately backed up at the point of cutting thereby preventing deflection in the blade with the result of the desired severance of the material.

A still further object of the present invention is the provision of a cutting tool of the class above pointed out which has been generally strengthened to perform the function desired.

It is an object of this invention to provide in a cutting tool, of the class above set forth, means whereby the amount of material being cut from lengths can be readily determined and duplicated.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a top plan view of a cutting tool embodying the improvements of this invention.

Fig. 2 is a side elevational view of the cutting tool of Fig. 1 as seen from the left hand side thereof of said Fig. 1.

Fig. 3 is a fragmentary horizontal sectional view of a portion of the cutting tool as seen from line 3—3 on Fig. 2.

Fig. 4 is a fragmentary vertical sectional view taken at right angle to that of Fig. 3 on line 4—4 on said Fig. 3.

Fig. 5 is an inverted plan view of the base of the cutting tool.

Fig. 6 is a perspective view of the cutting tool showing same in position at the start of a cutting operation.

Fig. 7 is a top plan view, similar to Fig. 1, of a cutting tool embodying the improvements of the invention and illustrating a modification thereof over that of Fig. 1.

Fig. 8 is a transverse sectional view through the cutting tool of Fig. 7 as seen from line 8—8 on said Fig. 7.

Fig. 9 is a sectional view through the cutting tool taken at right angle to that of Fig. 8 on line 9—9 on Fig. 7.

Fig. 10 is an enlarged sectional view through the mounting of the fixed blade taken on line 10—10 on said Fig. 1.

Throughout the several views of the drawings similar reference characters are employed to denote the same or similar parts.

The cutting tool of this invention comprises a base 10 in the form of a metal casting having a top 11 suitably strengthened by ribs 12 on the underside thereof. The physical embodiment of the invention utilizes a base 10 cast of cast aluminum and provides adjacent each of its four corners with an aperture 13 for screws, bolts or the like whereby it may be attached to a larger base (not shown) or a bench or table top (not shown). Near one side, for convenience designated the front 14, of the base 10 there is provided through the base top 11 an elongated aperture or opening 15 through which, as will later be made clear, the keen edge of the knife blade passes. Disposed in a recess 16 in the base top 11, see Fig. 4, at the forward edge of the elongated aperture or opening is a steel plate 17 which acts as the fixed cutting edge or blade, with said fixed blade 17 being removably secured by screws 18. The said fixed blade 17 has its cutting edge in vertical alignment with, or slightly rearwardly of, the front edge of the elongated aperture or opening 15. In order to properly position the fixed blade 17, the recess 16 is of greater lateral width than the corresponding width of the fixed blade 17 and the apertures in the blade 17 are larger than the diameter of the screws 18.

Behind the base plate elongated aperture or opening 15 is the blade supporting bracket 19 which, in effect, comprises a post 20 having extending from one side thereof at its lower end a lug 21. The bracket 19 has extending from the other side of the post 20 the body portion 22 which has length equal to or greater than the knife blade, to be subsequently described. The body portion 22 of the bracket 20 extends downwardly from the top of the post 20 to a point to have its lower edge 23 upwardly spaced from the supporting base top 11 an amount sufficient to permit the material being cut to pass thereunder.

The blade supporting bracket 19 may be secured to the base plate 10 in any suitable or desired manner, such for example, as by a bolt 24 extending entirely through the post 20 having its head 25 received in a recess in a lug 26 depending from the underside of the base top 11 and with its nut 25' on top of the post 20. Additionally a bolt 27 passes downwardly through the lug 21 to have a nut threaded thereon against the under surface of the base plate top 11.

The cutter blade 28 is illustrated as substantially rectangular in plan and of considerable relative width and thickness. With the blade 28 in the position illustrated most clearly in Figs. 2 and 4, the keen edge 29 thereof is within the base elongated aperture or opening 15 and below the upper surface of the fixed knife blade 17. The cutter blade 28 is pivoted by a bolt 29' to the bracket post 20 for swinging or oscillating movement from the position of Figs. 2 and 4 to that of Fig. 6. As will be seen in Fig. 3 the pivot bolt 29 passes entirely through the blade 28 and has its threaded portion threaded into the said post 20. Between the head of the pivot bolt 29' and adjacent face of the blade 28 there is provided a spring washer 30 for holding the blade 28 in close sliding contact with the said post 20.

In order to oscillate or actuate the cutting blade 28 about its pivot bolt 29' the said cutter blade 28 has projecting therefrom a tongue or tang 31 received in a slot 32 in an actuating handle 33. Any suitable or desirable means may be employed for connecting the handle 33 and blade tongue 31 to one another such for example, rivets 34. In order to limit the movement of the cutting blade 28 in a cutting direction the bracket 19 is provided with a lug 35 projecting beyond the bracket 19 and forwardly thereof to be contacted by the cutting blade handle 28 at the end of the cutting blade stroke.

As was noted above the cutting tool of this invention is to be employed for cutting relatively soft and/or yielding material which has a tendency to cause a deflection of the blade outwardly thereof with the result that the material is not cleanly cut or provided with a truly vertical face. To overcome this tendency and to prevent deflection of the cutter blade the bracket body portion 22 is provided intermediate its sides with a plurality of tapped apertures 36 each receiving a bolt or screw 37 having a flat nose or end 38. In operation, and as seen in Fig. 3, the screws 37 are adjusted to have their flat faces or noses 38 projecting ahead of the bracket body portion 22 to engage and back up the blade 28. The bolts or screws 37 are locked in this position against inadvertent displacement by lock nuts 39. It will be noted, particularly from Figs. 4 and 6, that the keen edge 29 of the blade 28 is obtained by bevelling the blade, as at 40, from the back or rear side of said blade toward the front side thereof. By this construction the keen edge 29 of the blade does not contact the projecting faces or noses 38 of the back up screws or bolts 37.

It is believed that the operation of the cutter is obvious from Fig. 6, the material to be cut is placed within the throat 41, formed between the lower edge 23 of the bracket body member 22 and the opposed face of the base member top 11, and with the knife blade 28 in the position illustrated in Fig. 6 is actuated in a clockwise direction or downwardly from the position shown. As the knife blade 28 descends its back surface is engaged by the back up screws 36 before the material is reached whereby no deflection or springing of the knife blade can occur as its keen edge 29 is passing through said material. The movement of the blade 28 is eventually stopped by the engagement of its tongue 31 and handle 33 with the bracket lug 35. The desired portion of the material cut may be either forwardly or rearwardly off the cutter or knife blade.

When it is desired to cut a plurality of similar pieces from a long length or coil of material use may be made of the gage carried by the base 10. As illustrated, the gage may comprise a gage support 42 received in a pocket or recess 43 formed within the base at the forward side or front 14 thereof. Upstanding from the gage support 42 is a gage member 44 bearing on its upper surface a suitable scale 45 which as illustrated, may be graduated in any suitable or desirable units, such as inches. Longitudinally of the gage member 44 there is a slot 46 receiving the clamping bolt 47 of a gage block 48 which is adjustable longitudinally of the gage member 44 on the gage support 42. The gage block 48 may take any suitable or desirable form such as illustrated most clearly in Fig. 6, with the clamping bolt 47 passing through one leg 49 thereof and utilizing its other leg 50 as an abutment for the material.

In use the material to be cut may be laid on the gage support 42 with the gage block 48 at the outermost end of the gage member 44 and advanced by increments to have pieces cut or severed from the other end thereof, or the gage block 48 may be set the desired distance from the knife blade 28 and the material feed from the back side of the machine to have the end thereof against the abutment arm 50 of the gage block and the successive pieces from the material thus cut to length.

It may be desirable to have the off-fall of the material being cut automatically collecting in a receptacle or it may be desirable to have the various pieces of the material cut from a length or coil automatically collected in a receptacle, in either case the pieces or off-fall should automatically fall through the cutting tool base 10 and such a mechanism is illustrated in Figs. 7, 8 and 9.

As illustrated in said Figs. 7, 8, and 9 the base 10 has its top 11 provided with an opening 51 of considerably greater dimension than the knife aperture or opening 15. With this construction the work should have the outermost end supported and since the said work or piece lengths may vary the outermost end 52 of the opening 51 is adjustable toward and from the fixed knife 17. This is accomplished by providing the base top 11 with the dove-tail groove 53 in which is received a slide 54 having a dove-tail transverse cross-section corresponding to the dove-tail sliding way 53. Any suitable or desirable means may be employed to effect the adjustment of the slide 54 such as the finger receiving notch 55 at the rear end of the slide. It will be readily apparent that in order to use the modified cutting tool of Figs. 7, 8 and 9 the table, bench or other support to which the cutting tool base 10 is secured must have an opening therein corresponding to the opening 51 and communicating with a receptacle located therebelow.

It is believed, in view of the foregoing, that the operation of the modified cutting tool is understood since the work should be fed through the throat 41 to a point whereby its free edge slightly over-laps the end 52 of the slide 54 so that after the material has been cut or severed the cut portion thereof, due to its weight, drops through the opening 51 and the opening in the support into the receptacle placed to receive the same.

What is claimed is:

1. In a cutting tool of the class described the combination of a base having a top, a bracket upstanding from said base and having a body portion overlying the base top to provide a cutting throat therebeneath, a cutting blade pivotly mounted on the bracket for movement through the cutting throat and adjustable means carried by the bracket body portion for engagement with and backing up the cutting blade at spaced points longitudinally thereof during its movement to prevent deflection thereof during the cutting operation.

2. In a cutting tool of the class described the combination of a base having a top, a bracket upstanding from said base and having a body portion overlying the base to provide a cutting throat therebeneath, a cutting blade pivotly mounted on the bracket for movement through the cutting throat, and adjustable means carried by the bracket body portion for engagement with and backing up the cutting blade at spaced points longitudinally thereof during its movement to prevent deflection thereof during the cutting operation, and said base having formed therein below the cutting throat an elongated aperture to receive the keen edge of the cutting blade.

3. In a cutting tool of the class described the combination of a base having an elongated aperture therein, a fixed cutting blade carried by the base adjacent one side of said aperture, a bracket upstanding from said base adjacent the other side of the aperture at one end thereof, a cutting blade pivotly mounted on the bracket for oscillation toward the base to have its keen edge project into the aperture past the fixed cutting blade to effect a cutting operation, said bracket including a body member having a length substantially equal to the length of the cutting blade and relative to which body member the blade moves during its cutting operation, and means separate from the bracket body member carried by said body member for engaging the rear surface of the cutting blade for backing up the blade at spaced points longitudinally thereof during the cutting operation.

4. In a cutting tool of the class described the combination of a base having an elongated aperture therein, a fixed cutting blade carried by the base adjacent one side of said aperture, a bracket upstanding from said base adjacent the other side of the aperture at one end thereof, a cutting blade pivotly mounted on the bracket for oscillation toward the base to have its keen edge project into the aperture past the fixed cutting blade to effect a cutting operation, said bracket including a body member having a length substantially equal to the length of the cutting blade and relative to which body member the blade moves during its cutting operation, and means carried by the body member for engaging the rear surface of the cutting blade for backing up the blade during the cutting operation, including bolts threaded into and through the bracket body member.

5. In a cutting tool of the class described the combination of a base having an elongated aperture therein, a fixed cutting blade carried by the base adjacent one side of said aperture, a bracket upstanding from said base adjacent the other side of the aperture at one end thereof, a cutting blade pivotly mounted on the bracket for oscillation toward the base to have its keen edge project into the aperture past the fixed cutting blade to effect a cutting operation, said bracket including a body member having a length substantially equal to the length of the cutting blade and relative to which body member the blade moves during its cutting operation, means separate from the bracket body member carried by said body member for engaging the rear surface of the cutting blade at spaced points longitudinally thereof for backing up the blade during the cutting operation, and means carried by the bracket body member for limiting the movement of the cutting blade in a cutting direction.

6. In a cutting tool of the class described the combination of a base having a top, a bracket upstanding from said base and having a body portion overlying the base top to provide a cutting throat therebeneath, a cutting blade pivotly mounted on the bracket for movement through the cutting throat, adjustable means carried by the bracket body portion for engagement with and backing up the cutting blade at spaced points longitudinally thereof during its movement to prevent deflection thereof during the cutting operation, and means carried by the base projecting forwardly thereof for positioning the material to be cut relative to the cutting blade.

7. In a cutting tool of the class described the combination of a base member having an aperture therein, a fixed cutting blade at one side of the aperture, a bracket upstanding from the base member at an edge of the aperture which is at substantially right angles to the fixed cutting blade, a cutter blade pivotly carried by the bracket for oscillatory movement across the edge of the fixed cutting blade, means carried by the base member for forming a side of the aperture and movable relative to the base member to vary the effective dimension of the aperture beyond the fixed blade, said bracket member including a body member overlying the base behind the movable cutter blade, and means carried by said body member for backing up the blade during its movement past the fixed cutting blade.

8. In a cutting tool of the class described the combination of a base member having an aperture therein, a fixed cutting blade at one side of the aperture, a bracket upstanding from the base member at an edge of the aperture which is at substantially right angles to the fixed cutting blade, a cutter blade pivotly carried by the bracket for oscillatory movement across the edge of the fixed cutting blade, means carried by the base member for forming a side of the aperture and movable relative to the base member to vary the effective dimension of the aperture beyond the fixed cutting blade, said bracket member including a body member overlying the base behind the movable cutter blade, and means carried by said body member for backing up the blade during its movement past the fixed cutting blade, comprising bolts threaded into and through said body member to project therebeyond.

9. In a cutting tool of the class described the combination of a base member having an aperture therein, a fixed cutting blade at one side of the aperture, a bracket upstanding from the base member at an edge of the aperture which is at substantially right angles to the fixed cutting blade, a cutter blade pivotly carried by the bracket for oscillatory movement across the edge of the fixed cutting blade, and means carried by the base member for forming a side of the aperture and movable relative to the base member to vary the effective dimension of the aperture beyond the fixed cutting blade, said bracket member including a body member overlying the base behind the movable cutter blade, means carried by said body member for backing up the movable cutting blade during its movement past the fixed cutting blade, and means on the body member for limiting the movement of the movable cutter blade after its keen edge has completely traversed the fixed blade.

10. In a cutting tool of the class described the combination of a base member having an aperture therein, a fixed cutting blade at one side of the aperture, a bracket upstanding from the base member at an edge of the aperture which is at substantially right angles to the fixed cutting blade, a cutter blade pivotly carried by the bracket for oscillatory movement across the edge of the fixed cutting blade, means carried by the base member for forming a side of the aperture and movable relative to the base member to vary the effective dimension of the aperture beyond the fixed cutting blade, said bracket member including a body member overlying the base behind the moveable cutter blade, means carried by said body member for backing up the movable cutting blade during its movement past the fixed cutting blade, and gage means carried by the base member for positioning the material relative to the cutter blades and determining the quantity of material being cut.

CHARLES H. ZIMMERMAN.

REFERENCES CITED

The following references are of record in the file of this patent:

UNITED STATES PATENTS

| Number | Name | Date |
|---|---|---|
| 90,184 | Nichol | May 18, 1869 |
| 247,566 | Kaempf | Sept. 27, 1881 |
| 950,099 | Fischer | Feb. 22, 1910 |
| 1,092,381 | Neely | Apr. 7, 1914 |
| 1,391,827 | Goetze | Sept. 27, 1921 |
| 1,958,132 | Davis | May 8, 1934 |
| 2,086,104 | Wensley | July 6, 1937 |
| 2,198,613 | Hayes | Apr. 30, 1940 |
| 2,254,188 | Poppenga | Aug. 26, 1941 |

FOREIGN PATENTS

| Number | Country | Date |
|---|---|---|
| 678,931 | Germany | July 25, 1939 |
| 305,443 | Great Britain | Feb. 7, 1929 |